June 24, 1958  R. E. ZOLLER  2,840,057
APPARATUS FOR REGULATING VAPOR TEMPERATURE
Filed Dec. 20, 1954  5 Sheets-Sheet 1

INVENTOR
BY RONALD E. ZOLLER
ATTORNEY

June 24, 1958 R. E. ZOLLER 2,840,057
APPARATUS FOR REGULATING VAPOR TEMPERATURE
Filed Dec. 20, 1954 5 Sheets-Sheet 2

INVENTOR
RONALD E. ZOLLER
BY
ATTORNEY

June 24, 1958 R. E. ZOLLER 2,840,057
APPARATUS FOR REGULATING VAPOR TEMPERATURE
Filed Dec. 20, 1954 5 Sheets-Sheet 3

INVENTOR
BY RONALD E. ZOLLER
ATTORNEY

June 24, 1958 R. E. ZOLLER 2,840,057
APPARATUS FOR REGULATING VAPOR TEMPERATURE
Filed Dec. 20, 1954 5 Sheets-Sheet 4

INVENTOR
RONALD E. ZOLLER
BY
ATTORNEY

June 24, 1958  R. E. ZOLLER  2,840,057
APPARATUS FOR REGULATING VAPOR TEMPERATURE
Filed Dec. 20, 1954  5 Sheets-Sheet 5

INVENTOR
BY RONALD E. ZOLLER
ATTORNEY

United States Patent Office 2,840,057
Patented June 24, 1958

2,840,057

APPARATUS FOR REGULATING VAPOR TEMPERATURE

Ronald E. Zoller, Hillfield Park, London, England, assignor to The Babcock & Wilcox Company, New York, N. Y., a corporation of New Jersey Application December 20, 1954, Serial No. 476,499

8 Claims. (Cl. 122—480)

The present invention relates to vapor generating and superheating systems, and more particularly to tubular marine boilers.

In marine turbine power plants, efficient operation at normal cruising speeds is necessary or desirable and high efficiency calls for high pressure and high temperature of superheat, but in some instances a relatively high maximum speed is required and efficiency, during the attainment of such speed, is of secondary consideration, since the speed is normally required only for short periods of time, so that a lower temperature of superheat may be tolerated. Such lower temperature, however, is higher than the temperature required for astern operation. In some ships, limits of space and weight are of great importance and difficulties arise in providing compact, light-weight boilers capable of giving the required output and vapor temperature characteristics.

An object of the present invention is to provide a compact form of boiler having flexible operating characteristics.

The present invention includes a tubular marine boiler comprising a combustion chamber, three parallel-connected gas passages leading from the combustion chamber, damper means for controlling the distribution of furnace gases between the gas passages, vapor generating tubes in each of the passages and tubular main and auxiliary superheating means, the main superheating means being confined wholly or substantially wholly to one of the passages and the auxiliary superheating means being confined wholly or substantially wholly to a second of the passages.

The invention also includes the method of operating a tubulous boiler forming part of marine propulsion plant, which includes during normal speed ahead passing a major part if not all of the gases from a combustion chamber over a main superheater and the remainder, if any, over an auxiliary superheater, to obtain a relatively high temperature of superheat; during full speed ahead reducing the gas flow resistance past the boiler and superheater heating surfaces by opening a by-pass to the superheaters and passing the gases partly over the main superheater, partly over the auxiliary superheater and partly through the by-pass, to obtain a high output at reduced temperature of superheat; and during astern operation passing some of the gases over the auxiliary superheater to obtain a relatively low temperature of superheat and the remainder through the by-pass.

The invention will now be described, by way of example, with reference to the accompanying partly diagrammatic drawings, in which.

Figure 1:
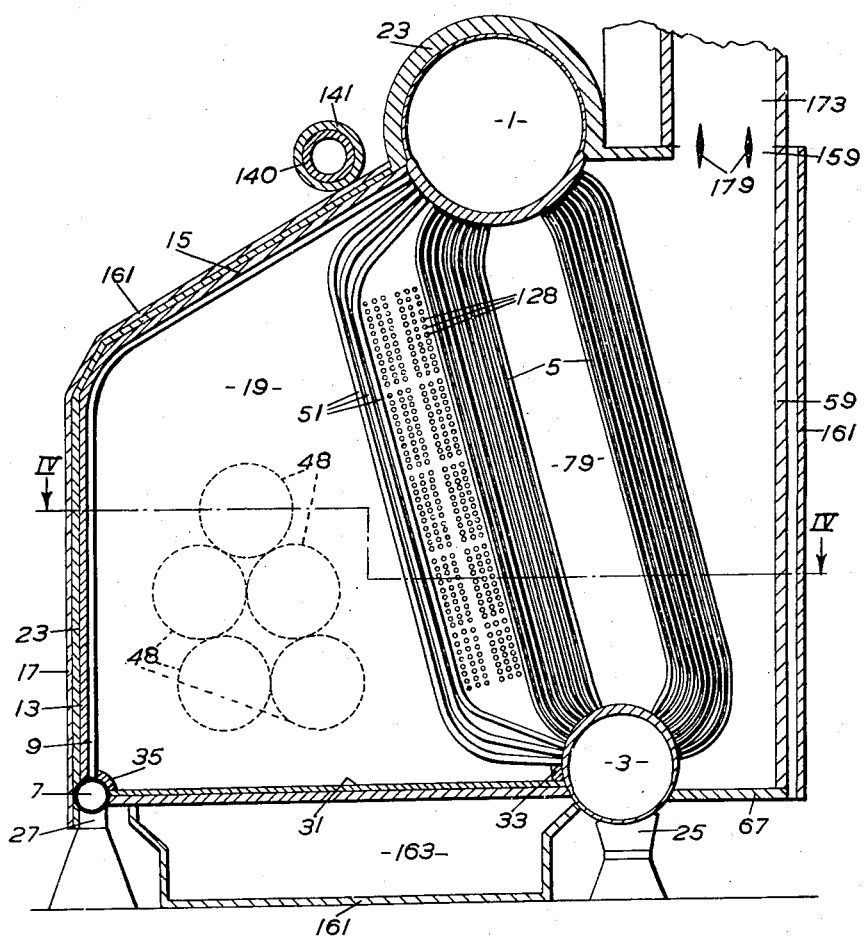
Fig. 1 is a sectional side view of a two drum marine boiler taken on the line 1—1 of Fig. 4, but showing only those parts adjacent the section plane, a baffle wall forming part of the boiler being omitted from this view.
Figure 2:
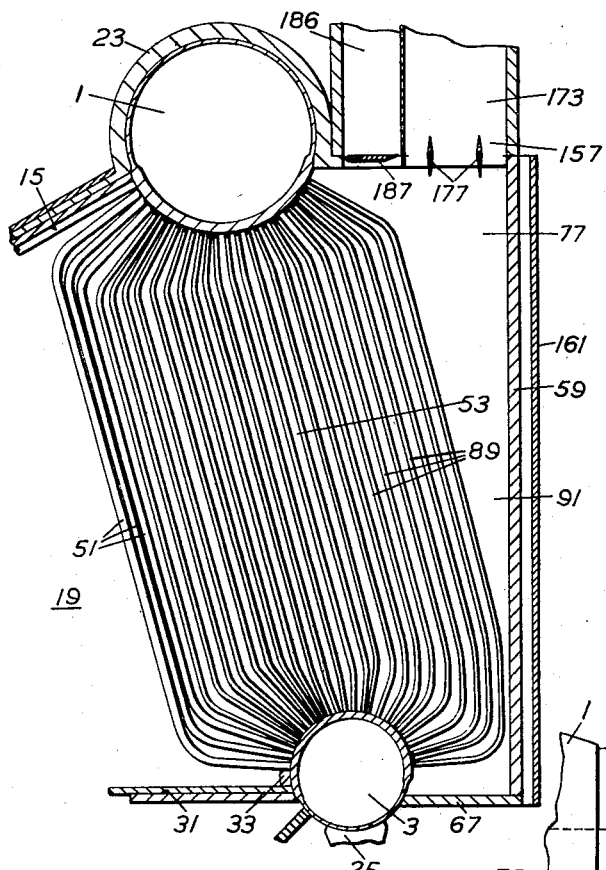
Fig. 2 is a sectional side view of part of the boiler shown in Fig. 1 but taken on the line 2—2 of Fig. 4.
Figure 3:
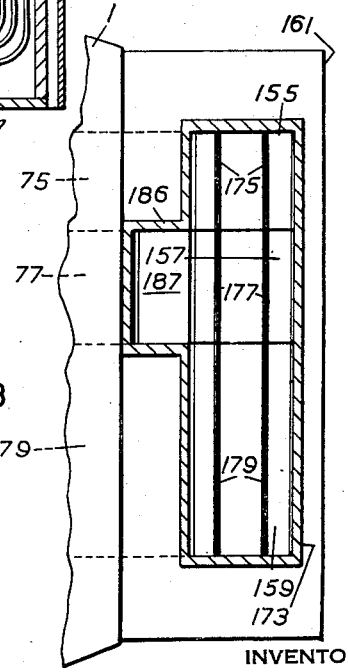
Fig. 3 is a plan view of the right-hand side of the boiler shown in Fig. 1.
Figure 4:
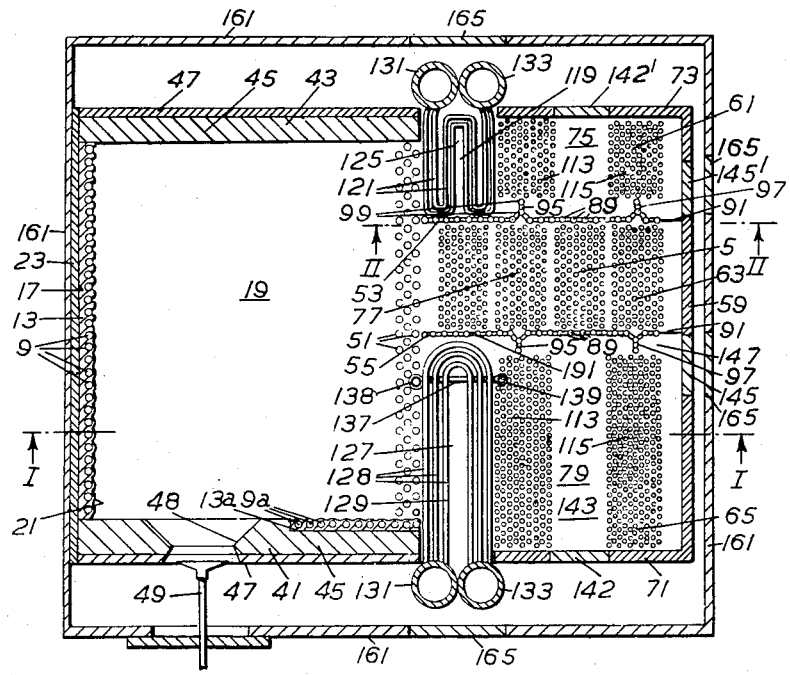
Fig. 4 is a sectional plan view taken on the line 4—4 of Fig. 1, but showing only those parts adjacent the section plane.

The boiler illustrated includes a horizontally arranged upper stream and water drum 1, a lower water drum 3 and a bank 5 of inclined vapor generating tubes connecting the two drums. A header 7 parallel to drum 3 is connected by aligned, bent wall tubes 9 to the upper drum 1. Tubes 9, which are spaced apart, are backed by refractory material 13, such as chrome ore, applied in plastic form, which also fills the intertube spaces, so defining roof 15 and a side wall 17 of a combustion chamber 19. Those of tubes 9 which are disposed near the front or firing end of the combustion chamber have their lower parts, in wall 17, covered with refractory material, as indicated at 21. The outside of roof 15 and wall 17 is covered with heat insulating material 23 which also extends to cover the outward surfaces of drum 1 and header 7.

Cradles 25 and 27 associated respectively with water drum 3 and header 7 and suitably mounted on the structure of the vessel serve to support the weight of the drums and of the tubular parts of the boiler.

The floor 31 of combustion chamber 19 is of any suitable construction, and those parts of water drum 3 and header 7 which would otherwise be exposed to heat from the combustion chamber 19 are protected with refractory material 33 and 35 respectively.

The front and rear end walls 41 and 43 of combustion chamber 19 are formed by fire-resisting brickwork 45 which is backed with heat insulating material 47, the bricks and insulation being suitably supported in known manner. That part of the inward surface of the front wall 41 which is remote from side wall 17 is provided with tubes 9a covered with refractory material 13a and connected at their upper and lower ends to drums 1 and 3 respectively.

Front wall 41 is provided with ports 48 fitted with oil burners 49 arranged to discharge along the combustion chamber 19 towards the rear wall 43.

The tube bank 5 includes a screen 51, of relatively large diameter, widely pitched tubes, extending along one side of the combustion chamber from front wall 41 to rear wall 43. Beyond this screen, baffle walls 53 and 55 extending from the screen 51 transversely of the drums 1 and 3 to a side wall 59 of the boiler setting serve to divide the remainder of the tubes of the tube bank into three sections, 61, 63 and 65. These baffle walls, in conjunction with setting front and rear walls 71 and 73 and a suitable floor 67 which joins setting side wall 59 to lower water drum 3, serve to define three parallel connected gas passages 75, 77 and 79 arranged in that order between the setting rear wall and the setting front wall and having lateral widths whose ratios are approximately 1:1:2.

Each of these baffle walls includes a part formed by tubes 89 forming part of the tube bank 5, these tubes being spaced apart but being provided with means for closing the intertube spaces so as to provide, together with a shaped sheet metal baffle 91, suitably located by lugs welded to the end tube of the tubular part of the baffle wall and by lugs secured to the adjacent setting wall 59, a continuous baffle between the setting side wall 59 and a point near to the tube screen 51.

Each baffle wall is so formed as to include two lateral extensions 95, 97 from its outer face, that is to say from the face of the baffle remote from the gas passage 77, each extension being formed by a pair of tubes 99, extending parallel to the remainder of the tubes of the baffle wall but displaced laterally with respect to the plane of the wall.

The vapor generating tubes of each of sections 61, 65 of the tube bank are arranged in two spaced groups 113 and 115, nearer to and further from the combustion chamber respectively, each group of tubes extending from a setting wall 71 or 73 towards the adjacent baffle wall 55 or 53 but terminating adjacent the tip of one of the lateral extensions 95, 97 of the baffle wall. Each lateral extension, 95 or 97, is arranged to lie throughout its length adjacent the mid-width of the neighboring tube group, 113 or 115. Thus the tubes of the two groups of each section are spaced somewhat from the plane of the adjacent baffle wall, but the lateral extensions 95, 97 substantially prevent by-passing of the tube groups by the flow of gases through the spaces between the inner ends of the tube groups and the adjacent baffle wall.

The tube group 113 in the gas passage 75 is separated from the tube screen 51 by a space 119 into which extend the sinuous tubes 121 of an auxiliary superheater 125. Between setting rear wall 73 and the adjacent end of the rear wall 43 of the combustion chamber is provided an opening through which the superheater tube bank may be inserted and removed. Similarly, the tube group 113 in the gas passage 79 is separated from the tube screen 51 by a space 127 into which extend the U-shaped tubes 128 of a main superheater 129, and an opening is provided between setting front wall 71 and the adjacent end of the front wall 41 of the combustion chamber through which the superheater tube bank may be inserted and withdrawn.

It is to be noted that the main and auxiliary superheating means are so arranged and dimensioned that diversion of gases from the auxiliary to the main superheating means, as described below, effects an increase of final temperature of superheat.

Each of the two superheaters comprises two inclined headers 131 and 133 and a bank of the tubes 121 (or 128) joining the two headers. These superheater headers are suitably divided by transverse diaphragms so as to obtain a flow of steam from header 131 through certain of the tubes to header 133, then back through certain other of the tubes to header 131 and so on. The superheater tubes 128 are supported near their inner ends on several vertically spaced supporting means 137 welded to two large bore tubes 138 and 139 forming part of tube bank 5 and disposed respectively in the tube screen 51 and in one of the tube groups 113.

The two superheaters are connected in series by a pipe 140 and extending above the roof 15 of the combustion chamber. Advantageously the auxiliary superheater 125 is arranged to receive superheated vapor from the main superheater 129 and is of heat resistant steel. In order to limit the stresses in the headers of the auxiliary superheater, the tube holes therein are arranged with a relatively wide spacing. To allow for the difference in the co-efficients of thermal expansion of the metals used for the outlet header of the main superheater and the inlet header of auxiliary superheater, the pipe 140 is made in two parts, a short part made of the high alloy steel and connected to the inlet header of the auxiliary superheater and the remainder of steel similar to that used for the outlet header of the main superheater. The two parts are connected by a suitable flanged joint which can accommodate the difference between the thermal expansions of the two pipes.

An access door 142 in wall 71 permits access to the space 143 between the tube groups 113 and 115 of passage 79, and a second access door 145 in the setting side wall 59 permits access to space 147 bounded by baffle wall 55, setting side wall 59 and the tube group 115. Similar access doors 142', 145' are provided for the gas passage 75.

The arrangement of tubes and superheaters described above permits ready maintenance of the baffle walls 53, 55 due to the provision of the access doors 142, 145, the access spaces 143, 147 and to the removability of the superheaters 125, 129.

The vapor generating tubes of section 63 of the tube bank are arranged in four closely spaced groups, each group extending from the baffle wall 53 up to the baffle wall 55. The three parallel arranged gas passages 75, 77 and 79 extend from the combustion chamber 19 respectively through the tube bank sections 61, 63 and 65 upwardly to three damper controlled main outlets 155, 157 and 159 which are described in more detail below. It will be seen that passage 77 acts as a by-pass for the two superheaters.

The complete boiler is enclosed in an outer casing, indicated diagrammatically in the drawings by 161, spaced outwardly from the walls 41, 43, 59, 71 and 73 and from floor 31 referred to above. Cooling air enters the casing at the rear of the boiler and passes either under the floor 31 through a duct 163 or between the side wall 59 and the casing 161 to the front of the boiler where it is used as combustion air for the burners 49. The casing is provided with suitable access doors 165 opposite the superheaters 125, 129 and opposite the access doors 145 in the setting side wall 59.

The passages 75, 77 and 79 join in a common duct 173 extending upwardly from above the outlets 155, 157, 159 from the passages, the passage 75 being provided at outlet 155 with dampers 175 for regulating the flow of gases through the passage and separately operable dampers 177, 179 being provided for the passages 77, 79.

Duct 173, which leads to the ship's smoke stack, contains an economizer (not shown) and has associated with it an economizer by-pass duct 186 provided with a damper 187 and extending upwardly from adjacent the outlet 157 of passage 77 only, this by-pass permitting gas from the passage 77 to reach the stack without contacting the economizer.

Figure 5:
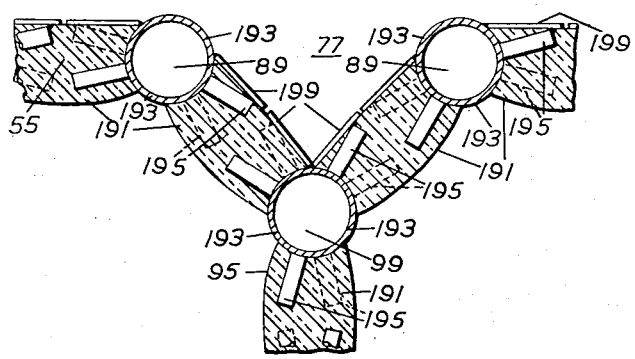
Fig. 5 is a sectional plan view of part of a baffle wall illustrated in Fig. 4, but drawn to a larger scale than in that figure.

The intertube spaces of each of the baffle walls are closed by refractory material 191 such as chrome ore which is applied in plastic form so as to fill the intertube spaces but to leave the faces 193 of the tubes exposed. The tubes 89 and 99 are provided with radially extending studs 195 welded to their exteriors and extending into the spaces between adjacent tubes of the baffle. The inner face of the baffle wall includes a number of thin flat metal plates 199 (see Fig. 5) extending partway across the intertube spaces, each plate being welded along one edge to a tube 89 or 99 and near the opposite edge to the tips of studs 195. The plates are sectionalized in the direction of the tube axis to avoid undue stresses caused by thermal expansion. These plates 199 together substantially close the spaces between the tubes and serve as a backing against which the refractory material 191 may be rammed and cooperate with the studs 195 in retaining the refractory material in position.

It will be appreciated that the arrangement of the tubes of the tube bank 5 described above provides admirable facilities for cleaning the tubes of the tube bank and of the superheater while the baffle-walls separating adjacent gas passages are readily accessible for inspection and repair.

The drum 1 is connected by appropriate downcomer means, not shown, to drum 3 and header 7 and is provided with suitable means for separating water from the steam.

During operation of the boiler described above the quantity of oil fuel supplied by the burners 49 is regulated in accordance with the load on the boiler, is burnt in the combustion chamber 19 and the hot products of combustion are allowed to pass through one or more of the three passages 75, 77, 79, depending upon the desired steam temperature, to the damper controlled outlets 155, 157, 159 and thence to the economizer and the smoke stack.

During starting up of the boiler from cold, the dampers 175, 179 provided at the outlets 155, 159 from the passages 75, 79 which contain the superheaters, are closed, so preventing any flow of hot gases over the superheaters and protecting them from overheating. At first hot gases flowing from the passage 77 are diverted from the duct 173 through the economizer by-pass duct 186 by opening by-pass damper 187 and closing main dampers 177, so avoiding excessive condensation on the economizer, but once the gases passing to the stack have reached a suitably high temperature, main dampers 177 are opened and by-pass damper 187 is closed, so causing all the hot gases to pass over the economizer.

Normally, the dampers controlling the flow of gases from the combustion chamber over the superheaters will be kept closed until steam is generated in the boiler. This steam passes from the drum 1 first through the main superheater 129, and then through the auxiliary superheater 125 and thence to its point of use, and once such a flow of steam has commenced, the dampers controlling the flow of hot gases over the superheaters may be opened as indicated below in order to obtain a desired final steam temperature.

The positioning of the various dampers described above to suit different operating conditions is indicated in the following table, values of the final steam temperature, for one particular example being given where appropriate.

| Operating Condition of Boiler | Position of damper— | | | |
|---|---|---|---|---|
| | 187 | 175 | 177 | 179 |
| | Associated with— | | | |
| | Economizer By-pass | Aux. Super-heater | passage containing— | |
| | | | No Super-heater | Main Super-heater |
| (1) Starting up (a) | Open | Closed | Closed | Closed. |
| (2) Starting up (b) | Closed | Closed | Open | Closed. |
| (3) Astern operation, 800° F | Closed | Open | Open | Closed. |
| (4) Full speed ahead, 950° F | Closed | Open | Open | Open. |
| (5) Normal speed ahead, 1,000° F. | Closed | Open | Closed | Open. |
| (6) Crusing ahead, 1,050° F | Closed | Partly Closed. | Closed | Open. |

It will be appreciated that during normal and cruising speeds when the associated turbines are operating with a high temperature of superheat the draught loss is maintained at a suitably low value since the load demand and, therefore, the furnace gas flow are limited and the same holds good for astern operation, whilst for full speed ahead the draught loss is limited to a suitable value since all the main damper means are open.

It will be seen that, provided the dampers are operated in proper sequence, during starting up of the boiler the flow of gases through the economizer is prevented and it is an important feature of the construction that the dampers provided for the control of superheat serve the additional purpose of protecting both the superheater and the economizer during starting periods. By the provision of the economizer by-pass and damper the cleanliness of the economizer is promoted, since it is at low ratings when the boiler is relatively cold that the economizer is caused to become foul with soot.

It will normally prove advantageous to provide a common operating means for the three sets of main dampers referred to above to insure operation of the dampers in proper sequence, and such an operating means is described below with reference to Figs. 6 and 7.

Figure 6:
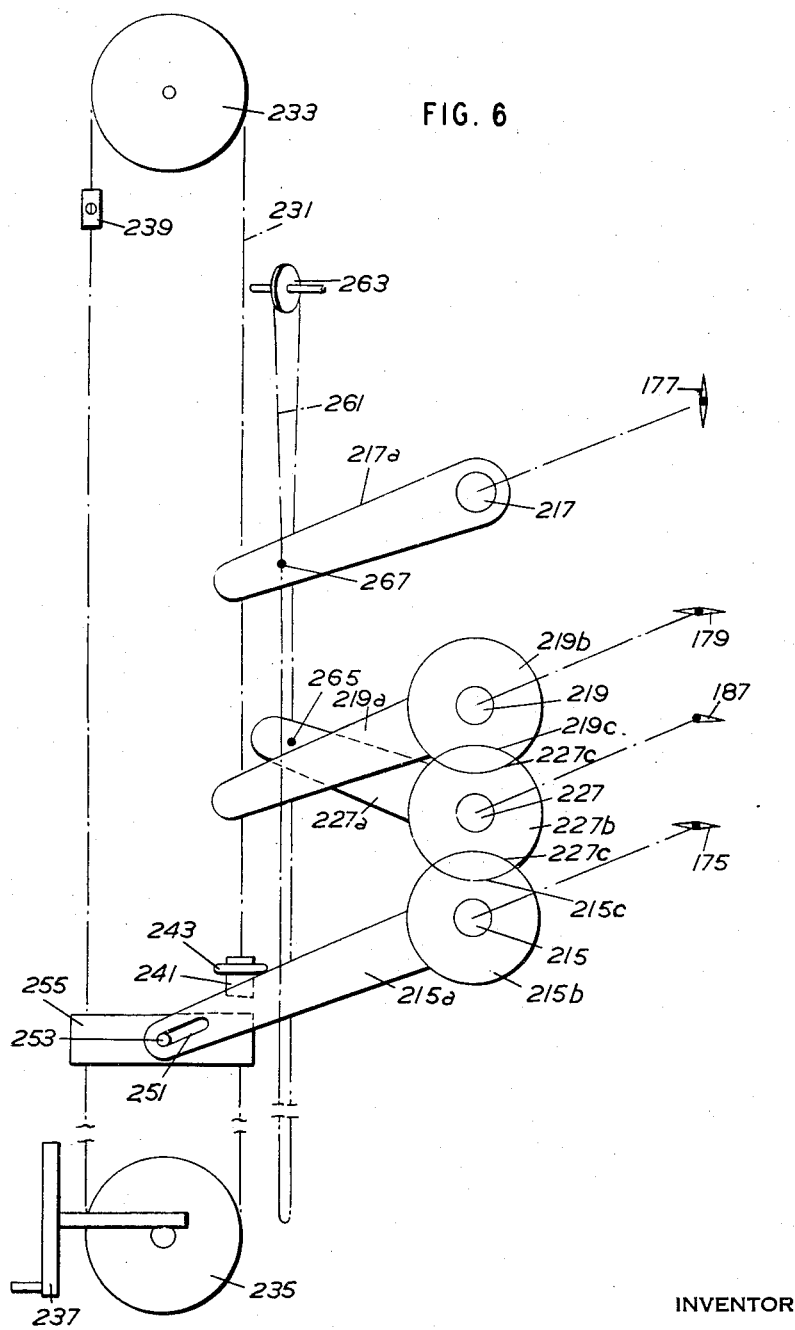
Fig. 6 is a side view of operating means and interlocking means for gas flow dampers associated with the above boiler.
Figure 7:
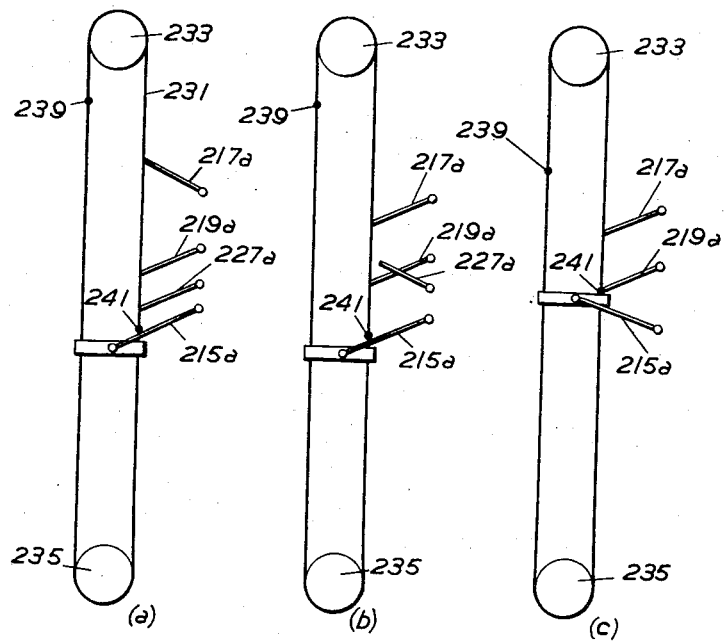
Figs. 7a to 7f are diagrams showing various operating positions of the operating means and interlocking means illustrated in Fig. 6.
Figure 7:
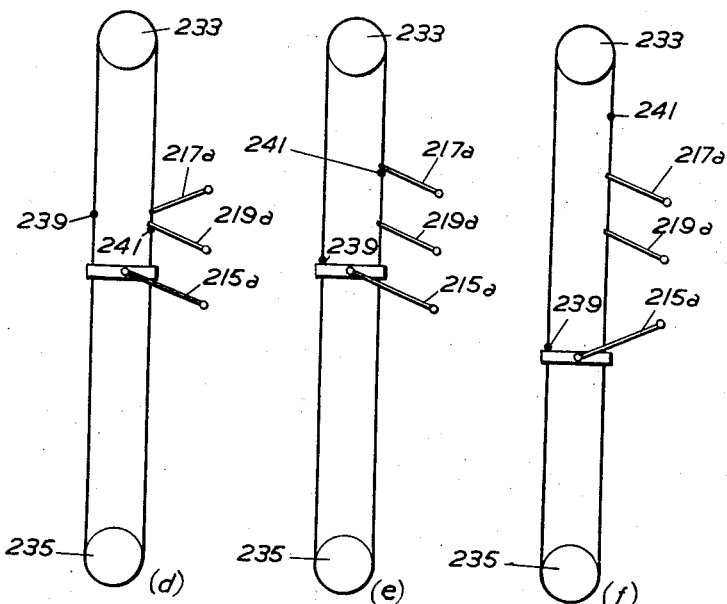

Referring first to Fig. 6, four parallel damper actuating shafts 215, 217, 219 and 227, rotatable through an operative angle, are respectively coupled by suitable mechanical linkages (not shown) to the dampers 175, 177, 179 and 187 and carry arms 215a, 217a, 219a and 227a. The arrangement of the mechanical linkages and of counterweights associated therewith is such that arms 217a, 219a and 227a will remain in any position into which they are placed, despite any forces which may be acting on those dampers; whereas arm 215a is constantly biased to an upward position by the associated linkage and counterweights. With the various arms in the positions shown, dampers 175, 179, and 187 are closed and damper 177 is open.

Shafts 215, 219 and 227 carry coplanar interlocking discs 215b, 219b and 227b respectively, discs 215b and 219b each being formed with a single peripheral recess, indicated by 215c and 219c, and disc 227b being formed with two peripheral recesses, 227c. It will be seen that the effect of these interlocking discs is to insure that by-pass damper 187 can be opened only if both damper 175 and damper 179 are fully closed, and conversely that damper 175 and/or damper 179 can only be opened if by-pass damper 187 is fully closed. Suitable adjustable stops may be provided for limiting the movements of the various arms.

Arranged to one side of the shafts is a vertically extending endless chain 231 passing over a freely rotatable upper pulley 233 and round a lower driving pulley 235, itself drivable through worm-and-wheel gearing by a handwheel 237, and carrying two adjustable blocks 239, 241, spaced apart along the chain and respectively on opposite sides of the upper pulley. Block 239 is in the form of a cylinder arranged co-axially with the chain, and block 241 consists of a cylindrical body part arranged co-axial with the chain and formed with a circumferential flange 243 extending normally of the plane of the chain.

The outward ends of arms 217a and 219a are so shaped and so arranged relative to the chain 231 that upward and downward movement of the block 241 past the arms causes the flange 243 to engage and to move these arms. It is necessary to provide suitable tensioning means for the chain 231 (not shown) in order that the chain may have the requisite amount of slackness to enable the flange 243 to leave each arm in such a posiiton that the flange may "pick-up" the arm during subsequent movement in the opposite direction.

The outer end of arm 215a is provided with a longitudinal slot 251 into which fits a cylindrical pin 253 mounted on the side of a block 255 through which the two runs of the chain are threaded. Downward movement of this arm may be effected either by the block 239 engaging the block 255 or by the block 241 engaging the upper edge of the arm.

Simultaneous operation of the arms 217a and 227a is effected by means of an endless chain 261 passing at its upper end over a freely rotatable pulley 263 and having its two strands or runs respectively connected to the arm 227a at 265 and to the arm 217a at 267, so that movement of the chain around the pulley 263 causes upward movement of arm 217a and downward movement of arm 227a, or vice versa.

The operation of the various damper actuating arms may be followed by reference to Figs. 7a to 7f, which respectively correspond to the settings of the dampers specified at (1) to (6) in the table above.

Thus Fig. 7a indicates the positions of the various arms during the initial stage of starting-up of the boiler, the arm 215a being held downwardly by the block 241, arm 219a remaining in its downward position, and arms 217a and 227a having been moved respectively to their upward and downward positions by manual operation of the chain 261 from its lower end, while Fig. 7b indicates the positions of the various arms during the later stages of starting-up of the boiler, actuation of the chain 261 having simultaneously lowered arm 217a (thus opening the dampers 177) and raised the arm 227a (thus closing the by-pass damper 187).

Rotation of the handwheel 237 raises the block 241, so permitting the arm 215a to rise, as shown in Fig. 7c, and thus opening the dampers 175. The position of arm 227a is not indicated in Figs. 7c, 7d, 7e and 7f since it remains unchanged during normal operation.

Further rotation of the handwheel 237 further raises the block 241 so as to raise the arm 219a, as shown in Fig. 7d, and thus open the dampers 179.

Continued rotation of the handwheel 237 further raises the block 241 so as to raise the arm 217a to the position shown in Fig. 7e and thus close the dampers 177.

Fig. 7f indicates the positions of the various arms corresponding to operating condition (6), continued rotation of the handwheel 237 having progressively lowered the stop 239 so as eventually to lower the arm 215a and thus progressively to bring the dampers 175 to a desired closed or partly closed position.

Clearly reverse movement of the handwheel 237 will cause operation of the various dampers in the reverse order.

The boiler described above is particularly compact and light-weight, it may be started rapidly without damage to the superheater, the temperature of superheat may be controlled and maintenance is facilitated.

An air heater may be provided instead of or in addition to the economizer. In either case a by-pass will be arranged to by-pass the air heater.

Although in the embodiment of the invention described above one of the passages is completely free from superheating surface, it may be desirable for some of the superheating surface to extend into or through that gas passage, although this has the effect of reducing the effectiveness of the dampers in varying the degree of superheat obtained. Thus, for example, the tubes of a superheater may be supported in the plane of the adjacent baffle wall, and parts of the tubes may extend short distances into the third gas passage; or the ends of a nest of superheater tubes located in a first passage may extend across one or both of the other passages to superheater headers located outside the passages.

If desired the invention may be applied to a boiler having two uptakes, one on each side of a vapor and liquid drum, the passage containing the main superheater leading to one uptake and the other passages leading to the second uptake. The boiler may be of the three drum type, the combustion chamber being disposed between and below the tube banks extending between the vapor and liquid drum and two lower drums respectively.

The final temperature of superheat obtained in the boiler illustrated in the accompanying drawings depends partly upon the rate of firing of the associated combustion chamber and, for any given positioning of the various dampers, the final steam temperature will fall as the rate of firing is decreased. In the description above it has been assumed that it is desired to obtain higher final steam temperatures during cruising ahead than during normal speed ahead, despite the fact that for cruising ahead the rate of firing will normally be considerably less than that for normal speed ahead. It will be seen that the final steam temperature may, if so desired, be maintained during cruising ahead at the value utilized for normal speed ahead by suitable adjustment of the damper means associated with the auxiliary superheating means.

What is claimed is:

1. A vapor generating and superheating unit comprising walls defining a combustion chamber, baffle walls defining three parallel gas passages opening to said combustion chamber, vapor generating tubes positioned between said combustion chamber and the gas entrance end of said parallel gas passages, vapor generating tubes positioned within each of said parallel gas passages the edge portion of one of said tube banks being spaced from the baffle wall forming a side of one of said gas passages, each of said upright baffle walls being provided with a vapor generating tube-containing lateral extension ending adjacent the edge portion of one of said vapor generating tube banks, spaced tubes forming a main superheater projecting through a side wall of said vapor generator and extending across one of said gas passages to a position spaced from the baffle wall of said gas passage, spaced tubes forming an auxiliary superheater projecting through an opposite side wall of said vapor generator and extending across another of said gas passages to a position spaced from the other baffle wall of said gas passage, vapor generating tubes positioned in the third gas passage between said baffle walls, and means for controlling the distribution of gas flow through each of said gas passages to control the superheat temperature of said vapor and the pressure drop of gas flow through said unit at different vapor flow rates from said unit.

2. A vapor generating and superheating unit comprising a combustion chamber, walls defining three parallel gas passages opening to a side of said combustion chamber, tubes forming a main vapor superheater positioned in one of said gas passages, tubes forming an auxiliary vapor superheater positioned in another of said gas passages, and vapor generating tubes in the third of said gas passages, separately operable dampers in the gas outlet of each of said parallel gas passages to control the distribution of furnace gas flow through said passages, walls defining a gas-pass positioned to receive all of the gases from said parallel gas passes, heat exchange elements in said gas-pass, walls defining a gas by-pass around said gas-pass opening only to said third parallel gas passage, and a separate damper in the outlet from said third gas passage for the selection of gas flow path to said gas by-pass.

3. A vapor generating and superheating unit comprising a combustion chamber, walls defining three parallel gas passages opening to said combustion chamber, vapor generating tubes positioned in said gas passages, tubes positioned in one of said gas passages to form a main vapor superheater, tubes positioned in another of said gas passages to form an auxiliary vapor superheater, vapor generating tubes only in the third gas passage, separately operable dampers positioned in the gas exit from each of said three parallel gas passages to control the distribution of gas flow through said gas passages, walls defining a gas pass positioned to receive all of the gases from said parallel gas passes, heat exchange elements in said gas pass, walls defining a gas bypass around said gas pass and opening to said third gas passage, a separate damper in the outlet from said third gas passage for the selection of the gas flow path to said gas bypass and linkage means connecting all of said dampers for the sequential unequal positioning thereof to attain a preselected pattern of gas flow distribution through said gas passages and said gas bypass.

4. A vapor generating and superheating unit comprising a combustion chamber, upright walls including at least one baffle wall defining multiple gas passages arranged to receive heating gases from said combustion chamber, at least one of said gas passages having horizontally disposed vapor heating tubes therein, upwardly inclined vapor generating tube banks disposed in said last named gas passage downstream of said vapor heating tubes, the edge portion of said vapor generating tube banks being spaced from the baffle wall forming a side of said gas passage, said baffle wall having a lateral projection throughout its height ending adjacent the edge portion of said vapor generating tube bank to deflect gas flow through said tube bank and to provide access to the wall for maintenance, at least one other of said gas passages having substantially upright banks of vapor generating tubes therein with the edge portions thereof positioned adjacent the walls of said gas passage, and damper means for regulating the flow distribution of gases through said gas passages.

5. A vapor generating and superheating unit comprising a combustion chamber, upright walls including baffle walls defining three parallel gas passages arranged to receive heating gases from said combustion chamber, vapor generating tubes positioned between said combustion chamber and said gas passages to define a fluid cooled screen, one of said gas passages having main horizontally disposed vapor heating tubes therein projecting across the gas passage behind said fluid cooled screen, another of said gas passages having auxiliary horizontally disposed vapor heating tubes therein projecting across the gas passage behind said fluid cooled screen, upwardly inclined vapor generating tube banks disposed in both of said gas passages behind said vapor heating tubes, the edge portion of said tube banks being spaced from the baffle walls forming one side of said gas passages, said baffle walls having a lateral projection throughout the height of each ending adjacent the edge portion of said vapor generating tube bank to deflect gas flow through said tube bank and to provide access to the wall for maintenance, the other of said gas passages having substantially upright banks of vapor generating tubes therein with the edge portions thereof positioned adjacent the walls of said gas passage, and damper means for regulating the flow distribution of gases through each of said gas passages to control vapor superheat temperatures and the draft loss of gas flow through said unit.

6. A vapor generating and superheating unit comprising a combustion chamber, upright walls including at least one baffle wall defining multiple parallel gas passages arranged to receive heating gases from said combustion chamber, vapor generating tubes positioned between said combustion chamber and said gas passages to define a fluid cooled screen therebetween, at least one of said gas passages having horizontally disposed vapor heating tubes therein projecting across the gas passage adjacent said fluid cooled screen, upwardly inclined vapor generating tube banks disposed in said gas-passage behind said vapor heating tubes in the direction of gas flow, the edge portion of said tube banks being spaced from the baffle wall forming a side of said gas passage, said baffle wall having a lateral projection throughout its height ending adjacent the edge portion of said vapor generating tube bank to deflect gas flow through said tube bank and to provide access to the wall for maintenance, at least one other of said gas passages having substantially upright banks of vapor generating tubes therein with the edge portions thereof positioned adjacent the walls of said gas passage, and damper means for regulating the flow distribution of gases passing through said gas passages to control the superheat temperature of said vapor at different vapor flow rates from said unit.

7. A vapor generating and superheating unit comprising a combustion chamber, upright walls including baffle walls defining three parallel gas passages arranged to receive heating gases from said combustion chamber, vapor generating tubes positioned between said combustion chamber and said gas passages to define a fluid cooled screen therebetween, one of said gas passages having horizontally disposed main vapor heating tubes therein projecting through a side wall of said unit and across the gas passage adjacent said fluid cooled screen, another of said gas passages having horizontally disposed auxiliary vapor heating tubes therein projecting through an opposite side wall of said unit and across the gas passage adjacent said fluid cooled screen, upwardly inclined vapor generating tube banks disposed in said gas-passages behind said vapor heating tubes in the direction of gas flow, the edge portion of said tube banks being spaced from the baffle wall forming a side of each of said gas passages, said baffle walls having a lateral projection throughout its height ending adjacent the edge portion of said vapor generating tube bank to deflect gas flow through said tube bank and to provide access to the wall for maintenance, the third of said gas passages having substantially upright banks of vapor generating tubes therein with the edge portions thereof positioned adjacent the walls of said gas passage, and damper means for regulating the flow distribution of gases passing through said gas passages to control the superheat temperature of said vapor and the pressure drop of gas flow therethrough at different vapor flow rates from said unit.

8. A vapor generating and superheating unit according to claim 7 wherein the cross-sectional gas flow area of the gas passage containing said main vapor heating tubes is generally equal to the combined gas flow area of the other two passages.

References Cited in the file of this patent

UNITED STATES PATENTS

| | | |
|---|---|---|
| 2,048,039 | Stillman | July 21, 1936 |
| 2,170,345 | Bailey et al. | Aug. 22, 1939 |
| 2,293,735 | Hardgrove | Aug. 25, 1942 |
| 2,590,712 | Lacerenza | Apr. 22, 1948 |
| 2,649,079 | Van Brunt | Aug. 18, 1953 |

FOREIGN PATENTS

| | | |
|---|---|---|
| 551,483 | Great Britain | Feb. 24, 1943 |